United States Patent [19]

Kleinberg et al.

[11] Patent Number: 4,938,575

[45] Date of Patent: Jul. 3, 1990

[54] MICROSCOPE SYSTEM AND ATTACHMENT

[75] Inventors: Larry K. Kleinberg, Toluca Lake; Douglas R. Mongeon, Orange, both of Calif.

[73] Assignee: Storz Instrument Company, St. Louis, Mo.

[21] Appl. No.: 251,571

[22] Filed: Sep. 30, 1988

[51] Int. Cl.⁵ .......................................... G02B 21/20
[52] U.S. Cl. .................................. 350/516; 350/517; 350/518
[58] Field of Search ............... 350/516, 517, 522, 511, 350/514, 518

[56] References Cited

U.S. PATENT DOCUMENTS

| | | | |
|---|---|---|---|
| 3,418,034 | 12/1968 | Ambrose | 350/517 |
| 4,008,946 | 2/1977 | Tsuda et al. | 350/511 |
| 4,167,302 | 9/1979 | Karasawa | 350/516 |
| 4,605,287 | 8/1986 | Lang et al. | 350/513 |
| 4,640,588 | 2/1987 | Tanaka | 350/516 |
| 4,657,356 | 4/1987 | Matsumura | 350/516 |
| 4,763,968 | 8/1988 | Minami et al. | 350/516 |
| 4,798,451 | 1/1989 | Fujiwara | 350/522 |
| 4,802,749 | 2/1989 | Togino et al. | 350/516 |

*Primary Examiner*—Bruce Y. Arnold
*Assistant Examiner*—Martin Lerner
*Attorney, Agent, or Firm*—Brooks & Kushman

[57] ABSTRACT

The present invention is a microscope system including an objective lens common to at least two paths of light rays from an image to be viewed and a prism for redirecting at least one of the light rays in a direction orthogonal to the other of the light rays which travels to a first viewing station. An optical focus is provided in alignment with the orthogonal light ray for magnifying the orthogonal light ray. A plurality of prisms being rotatable are provided for redirecting the orthogonal light ray to a second viewing station which is maintained parallel to the image.

20 Claims, 41 Drawing Sheets

MICROSCOPE SYSTEM AND ATTACHMENT

BACKGROUND OF THE INVENTION

1. Field of the Invention

The present invention relates to microscopes adapted primarily for surgical procedures, more particularly to, microscopes having two viewing stations.

2. Description of Related Art 2.

In the practice of ophthalmology, assistant surgeons, nurses, students, and other technical personnel are involved with the primary surgeon during the performance of surgical procedures upon the eye, or upon any other generally relatively flat surface or tissue to be treated. As a result, a particular image must be observed by the primary surgeon and the assistant with a single microscope.

Referring to FIG. 1, an example of a microscope system to observe an image by the primary surgeon and assistant is shown. This microscope system consists of two independent microscopes with identical optical axes below a common beam splitter 1. The primary surgeon views the image through the main microscope 2 which passes through the common beam splitter 1. The assistant views the image through the assistant's microscope 3 which passes through the common beam splitter 1 and an internal focus 4. The image is reflected by mirror 5 and passes through the 3-step magnification changer 6 in the tube 7 of the assistant's microscope 3.

One disadvantage with the above microscope system is that a beam or ray of light must be split by a beam splitter. This results in a greater light loss to both the primary surgeon and the assistant. Another disadvantage is that the ray of light to the assistant is reflected by mirrors. This prevents the assistant from manipulating his binocular so that it is always parallel to the image when the microscope is at an oblique angle to the image. Otherwise, there would be a view angle difference.

It is, therefore, one object of the present invention to provide a microscope system which allows a primary and secondary observer to simultaneously view the same image.

It is another object of the present invention to provide at least two station viewing without the use of beam splitters or mirrors.

It is a further object of the present invention to allow the secondary observer to manipulate its binocular so that the binocular is always parallel to the image while the microscope is at an oblique angle to the image.

SUMMARY OF THE INVENTION

Accordingly, the present invention is a microscope system including an objective lens common to at least two paths of light rays from an image to be viewed and prism means for re-directing at least one of the light rays in a direction orthogonal to the other of the light rays which travels to a first viewing station. An optical focus means is provided in alignment with the orthogonal light ray for magnifying the orthogonal light ray. A plurality of prisms being rotatable are provided for redirecting the orthogonal light ray to a second viewing station which is always parallel to the image.

One advantage of the present invention is that the assistant who sits 90 degrees to the primary surgeon can manipulate his binocular so that it is always parallel to the image and the microscope can be at an oblique angle to the image. Another advantage of the present invention is that the microscope system will allow for an angular deviation while maintaining correct image orientation. A further advantage of the present invention is that the use of beam splitters and mirrors are eliminated. A still further advantage of the present invention is that a greater amount of light is provided to both the primary surgeon and the assistant.

Other advantages of the present invention will be readily appreciated as the same becomes better understood by reference to the following detailed description when considered in connection with the accompanying drawings.

DESCRIPTION OF THE PREFERRED EMBODIMENT

Figure 1:
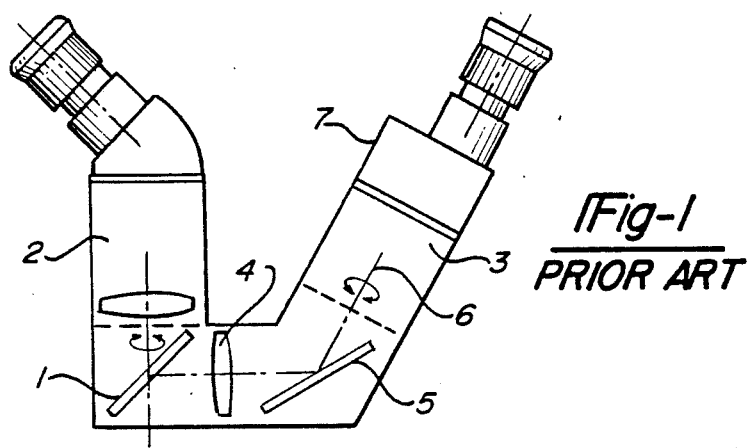
FIG. 1 is an elevational view of a prior art microscope system.
Figure 2:
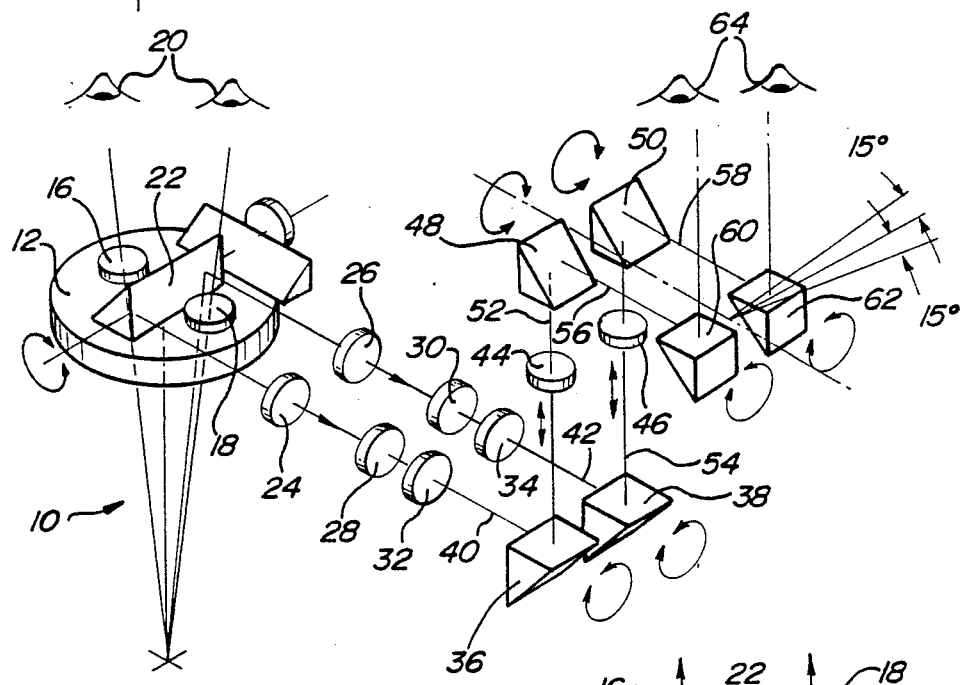
FIG. 2 is a schematic diagram of a network of optical elements or prisms forming the microscope system according to the present invention.

Referring to FIG. 2, a schematic diagram of the optical elements of the microscope system 10 according to the present invention is shown. The microscope system 10 includes a common objective lens 12 in spaced relationship to an image 14 to be viewed. A typical objective lens may be found in U.S. Pat. No. 4,688,907, issued Aug. 25, 1987, in the name of Larry K. Kleinberg, which is hereby incorporated by reference. A pair of laterally spaced lenses 16 and 18 are disposed vertically above the objective lens 12. A pair of a primary observer's eyes 20, such as those of the primary surgeon, view the image 14 by rays of light which pass through the objective lens 12 and lenses 16 and 18 to the primary observer's eyes 20.

The microscope system 10 also includes a generally triangular right angle prism 22 disposed adjacent the objective lens 12. The prism 22 is rotatable about its longitudinal axis for a total angle of approximately ninety (90) degrees. The prism 22 redirects the rays of light from the image 14 at ninety (90) degrees in the unused portion of the objective lens 12. In other words, the rays of light from the image 14 are redirected by the prism 22 orthogonal to the rays of light passing to the primary observer's eyes 20. The microscope system 10 includes a first pair of lenses 24 and 26 disposed laterally of the prism 22. A second pair of lenses 28 and 30 are laterally spaced from the first pair of lenses 24 and 26. A third pair of lenses 32 and 34 are spaced laterally of the second pair of lenses 28 and 30. Lenses 24, 26, and 28, 30, and 32, 34 are used to orientate or flip the image 14 for proper viewing. These lenses also act as an internal focus and provide for one to one optics at the viewing site and are commonly referred to as "infinity systems."

The microscope system 10 further includes a first pair of generally triangular right angle prisms 36 and 38 disposed laterally of the third pair of lenses 32 and 34. The first pair of prisms 36 and 38 rotate about lateral axes 40 and 42 as indicated by the arrows in the figure. Lenses 24, 26, 28, 30, 32, 34 and prisms 36 and 38 are spaced along axes 40 and 42, respectively. A fourth pair of lenses 44 and 46 are spaced vertically above the first pair of prisms 36 and 38. A second pair of generally triangular right angle prisms 48 and 50 are spaced vertically above the fourth pair of lenses 44 and 46. The second pair of prisms 48 and 50 and the fourth pair of lenses 44 and 46 are spaced along vertical axes 52 and 54, respectively. A third pair of prisms 60 and 62 are spaced along the axes 56 and 58 from the second pair of prisms 48 and 50. The third pair of prisms 60 and 62 rotate about axes 56 and 58, respectively, as indicated by the arrows in the figure approximately 15 degrees in each direction for a total angle of 30 degrees of articulation. A pair of secondary observer's eyes 64 are disposed vertically above the third pair of prisms 60 and 62 for viewing the image 14.

In operation, the observer's eyes 64 view the image 14 which passes through the objective lenses 12, prism 22, lenses 24, 26, 28, 30, 32, 34, prism 36, 38, lenses 44, 46 and prism 48, 50, 60, 62 to the observer's eyes 64. The secondary observer who sits 90 degrees to the primary observer may manipulate its binocular so that it is always parallel to the image 14. This is accomplished by making the prisms 36, 38, 60, 62 rotate around their optical axes 40, 42, 56, 58 as indicated by the arrows in the figure. The optical path is also stretched and compressed as indicated by the arrows in the figure. The microscope system 10 allows for an angular deviation while maintaining correct image orientation. Since no beam splitting is required, there is a lesser degree of light loss to the primary observer's eyes 20 with more light provided to the secondary observer's eyes 64. Both observer's eyes 20 and 64 see the image 14 in full stereo view with no view angle difference.

Figure 3:
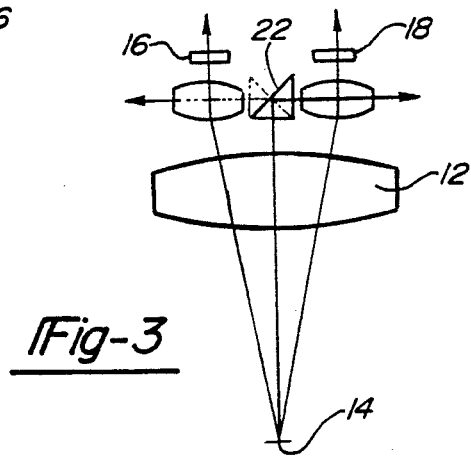
FIG. 3 is a front view of the schematic diagram of FIG. 2.

Referring to FIG. 3, a front view of the optical elements for the primary observer is shown. These optical elements are embodied in housing to allow them to be optionally attached on either side of a conventional microscope (not shown).

Figure 4:
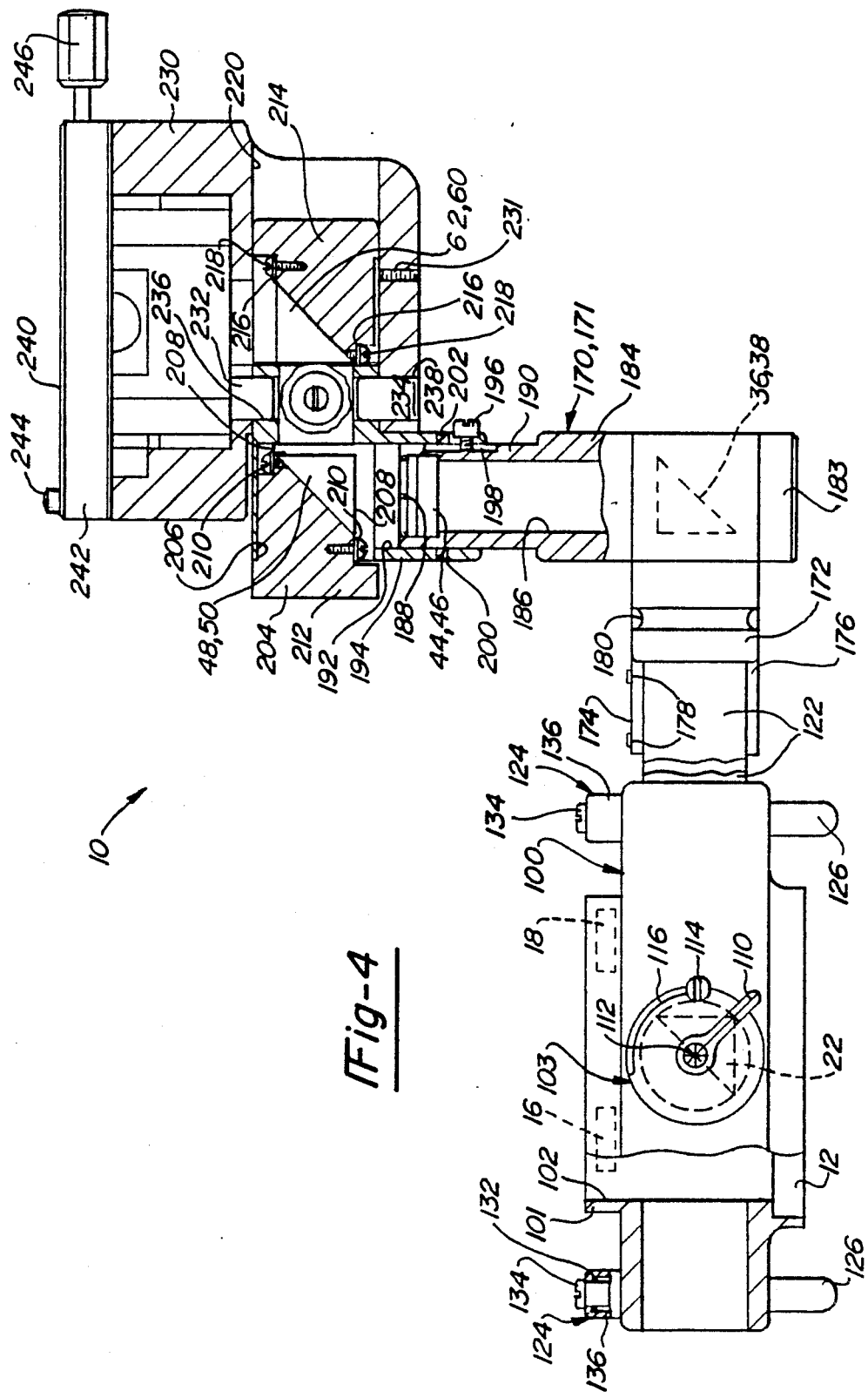
FIG. 4 is a front elevational view with portions broken away of a microscope system according to the present invention.
Figure 5:
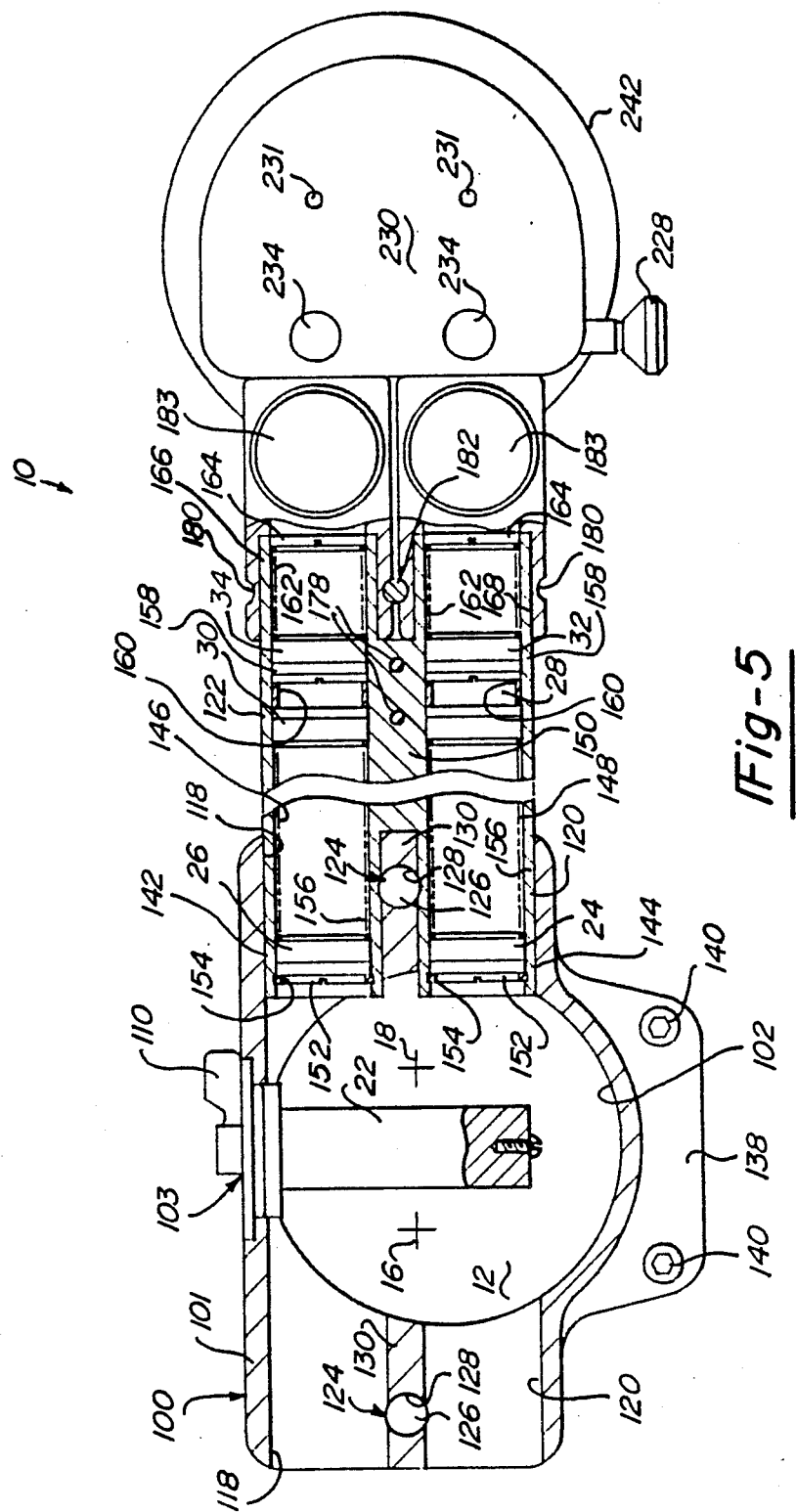
FIG. 5 is a plan view with portions broken away of the microscope system of FIG. 4.
Figure 6:
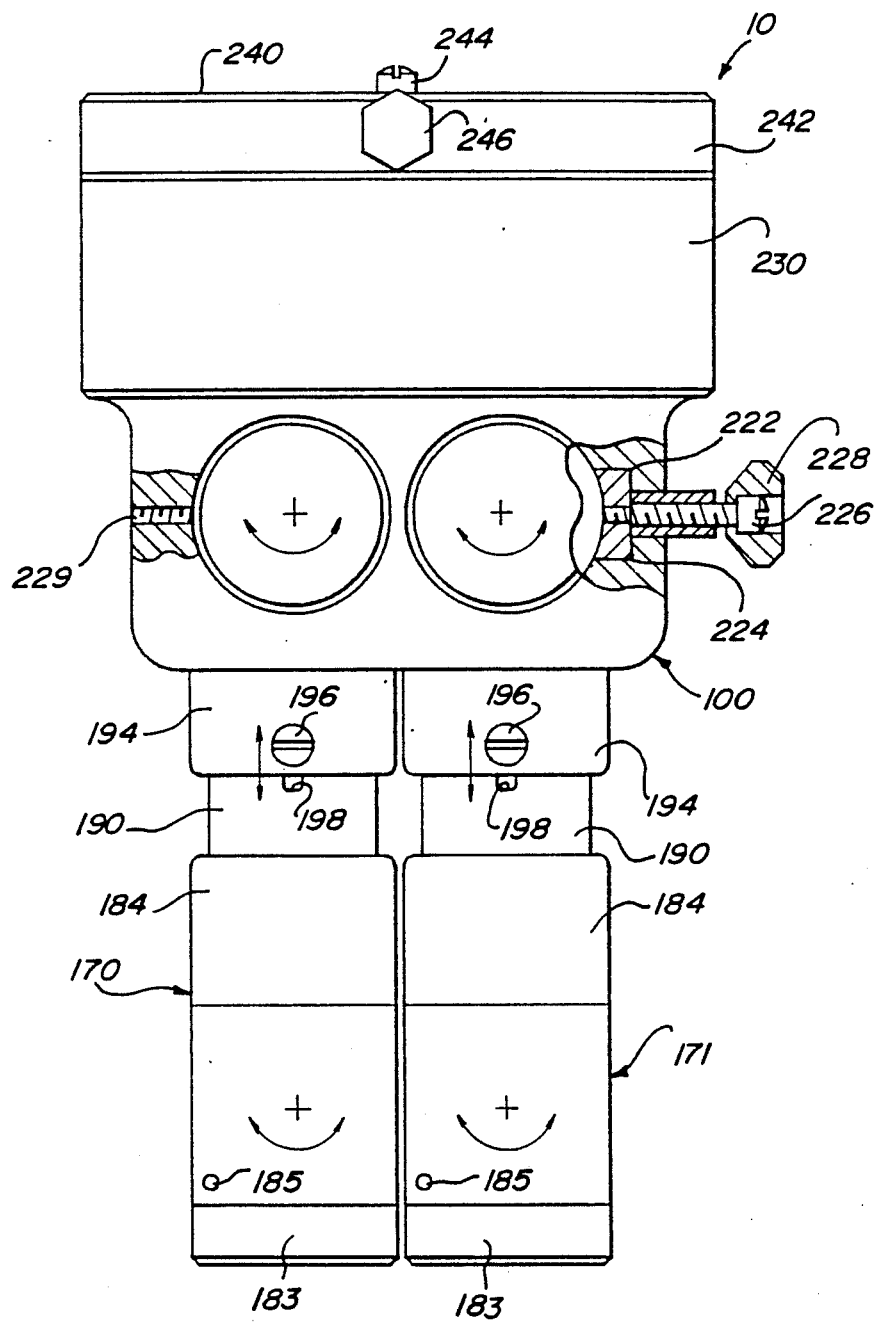
FIG. 6 is a side elevational view with portions broken away of the microscope system of FIG. 4.

Referring to FIGS. 4, 5, and 6, the microscope system 10 is embodied in a zero (0) to ninety (90) degree stereo attachment, generally indicated at 100. The attachment 100 includes a primary housing 101 for containing and supporting the objective lens 12. The objective lens 12 is disposed in a generally circular aperture 102 formed in the primary housing 101 and secured therein by screwing the objective lens 12 into the primary housing 101 in a known manner. A prism holder generally indicated at 103 supports the prism 22 adjacent the objective lens 12 within the primary housing 101. The prism 22 is secured to the prism holder 103 by an adhesive such as epoxy. A lever 110 is connected by a first fastener 112 to the prism holder 103. The primary observer grasps the lever 110 to rotate the prism 22 about its longitudinal axis. A second fastener 114 is spaced laterally of the fastener 112 and prevents movement of the prism holder 103 longitudinally and secures it in the primary housing 101. The prism holder 103 has a recessed portion 116 that cooperates with the fastener 114 which also acts as a stop to limit the rotation of the prism 22.

The primary housing 101 includes a pair of spaced passageways 118 and 120 communicating diametrically through the primary housing 101. The passageways 118 and 120 allow either side of the primary housing 101 to be secured to an extension housing 122. A locking mechanism generally indicated at 124 releasably locks the primary housing 101 to the extension housing 122. The locking mechanism comprises a spring loaded pin 126 communicating vertically through an aperture 128 formed in a wall 130 of the primary housing 101 separating the passageways 118 and 120. The pin 126 has an undercut (not shown) which operatively cooperates with the extension housing 122 to lock the primary housing 101 in place. A spring 132 is disposed about one end of a fastener 134 secured to the primary housing 101. The spring 132 is confined by a spring retainer 136 at one end and abuts the undercut on the pin 126. The pin 126 is depressed which compresses the spring 132 to allow the primary housing 101 to be removed from the extension housing 122. The process is reversed for locking the primary housing 101 to the extension housing 122.

As illustrated in FIG. 5, the primary housing 101 has an outwardly extending flange 138. A pair of fasteners 140 such as cap screws are disposed in corresponding apertures (not shown) of the flange 138. The flange 138 allows the attachment 100 to be secured within an existing microscope or allow additions to be secured in the future.

The extension housing 122 is generally rectangular and has generally circular extensions 142 and 144 at one end disposed in the passageways 118 and 120, respectively, of the primary housing 101. The extension housing 122 forms a pair of spaced generally circular passageways 146 and 148 therein separated by a wall 150 of the extension housing 122. A first lock ring 152 being generally circular is disposed in a corresponding groove 154 in each passageway 146 and 148 at one end. The first pair of lenses 24 and 26 are disposed in the passageways 146 and 148, respectively. A lens spring 156 is disposed in the passageway between lenses the first pair of lenses 24, 26 and the second pair of lenses 28, 30 which are also disposed in the passageways 146 and 148, respectively. A second lock ring 158 is also disposed in the passageways 146 and 148 on the other side of the second pair of lenses 28 and 30. A spacer 160 is disposed in the passageways 146 and 148 and abuts the second lock ring 158 to provide an air gap between the lenses 28 and 30 and the second lock ring 158 in the passageways 146 and 148. The third pair of lenses 32 and 34 are also disposed in the passageways 146 and 148 on the other side of the second lock rings 160. A lens spring 162 is disposed between the third pair of lenses 32 and 34 and a third pair of lock rings 164 at the other end of the passageways 146 and 148 for adjustment reasons, e.g. to compress or extend the lens spring 162 for focusing. The extension housing 122 has generally circular extensions 166 and 168 formed at the other end and similar to extensions 142 and 144.

The attachment 100 further includes a pair of generally "L" shaped extensions 170 and 171 having a horizontal portion 172 disposed about extensions 166 and 168 of the extension housing 122. An upper pivot plate 174 and a lower pivot plate 176 are connected to and disposed about the extension housing 122. A pair of fasteners 178 secure the pivot plates 174 and 176 to the extension housing 122.

The longitudinal portion 172 includes a semi-circular groove 180 about the circumference thereof. A pivot pin 182 which acts a bearing is disposed between the pair of L-shaped extensions 170 and 171 in the groove 180. The upper 174 and lower 176 pivot plates secure the pivot pin 182 between them and prevent its movement. The horizontal portion 172 of the pair of L-shaped extensions 170 and 171 rotate or pivot about the extensions 166 and 168, respectively, of the extension housing 122. Each horizontal portion 170 has a prism 36, 38 mounted to a prism mount 183 which is generally circular in shape and disposed within a passageway 186 of a vertical portion 184 of the L-shaped extensions 170 and 171. The prism mounts 183 are secured to the vertical portion 184 by set screws 185. The lenses 44 and 46 are disposed in the passageway 186 at the other end and are held in place by a fourth lock ring 188. The vertical portion 184 includes a necked-down portion 190 partially disposed in an aperture 192 formed in one end of a generally L-shaped lens housing 194. The lens housing 194 includes a fastener 196 cooperating with a slot 198 formed in the necked-down portion 190 which acts as a slide stop to limit the vertical movement between the necked-down portion 190 and the lens housing 194. The fastener 196 also prevents separation between the L-shaped extensions 170 and 171 and lens housing 194. An O-ring 200 is disposed in a corresponding groove 202 of the lens housing 194 to sealingly engage the necked-down portion 190. The optical path can be stretched or compressed by relative movement between the vertical portion 184 and the lens housing 194.

A first prism mount 204 is disposed in a generally circular aperture 206 of the lens housing 194. The prisms 48 and 50 are secured to the prism mount 204 by a clamp or washer 208 and a corresponding fastener 210. The prism mounts 204 are secured to the lens housing 194 by set screws (not shown). The prisms 60 and 62 are secured to prism mounts 214 by a clamp 216 and corresponding fastener 218. The prism mounts 214 are generally circular in shape and are disposed in corresponding apertures 220 of the base housing 230. The prism mounts 214 are secured to the base housing 230 by set screws 231 which engage the prism mount 214 and prevent any relative movement between it and the base housing 230. A stop 222 engages the lens housing 194 and is disposed in a corresponding aperture 224 of the base housing 230. A fastener 226 engages the stop 222. A lock screw 228 is disposed about the fastener 226. The lock screw 228 is then grasped by the secondary observer and pivoted or rotated to operatively lock the base housing 230 in position relative to the lens housing 194 and to disengage the stop 222 from the lens housing 194. A set screw 229 or a stop, fastener and lock screw arrangement may be used on the other side of the base housing 230 to lock it to the other lens housing 194.

The base housing 230 operatively cooperates with the lens housing 194. The base housing 230 includes an upper 232 and lower 234 stop pin partially disposed in corresponding annular groove 236 of the lens housing 194. The stop pins 232 and 234 allow the base housing 230 to rotate about the lens housing 194 in the annular groove 236 for an articulated fifteen (15) degrees in either direction. Hence, the prisms 60 and 62 rotate relative to prisms 48 and 50. A mask 240 conventionally known in the art is disposed within a binocular ring 242 on the upper side of the base housing 230. Fasteners 244 secure the mask 240 and binocular ring 242 to the base housing 230. A clamp screw 246 extends outwardly from the ring 242 and secures the ring 242 to the mask 240.

In operation, the primary housing 101 is above an image to be viewed. The light rays from the image 14 pass through the objective lens 12 and lenses 16 and 18 to the primary observer's eyes 20. Simultaneously, light rays from the image 14 pass through the prism 22 orthogonal to the light rays to the primary observer's eyes. If the primary housing 101 has one side or the other attached to the remaining portion of the attachment 100, the prism 22 may have to be rotated ninety (90) degrees by displacing the lever 110.

The light rays from the prism 22 travel through passageways 146 and 148 and lenses 24, 26, 28, 30, 32 and 34 in the extension housing 122. The light ray is focused by these lenses as previously described. The light rays then travel to prisms 36 and 38. The L-shaped extensions 170 and 171 to which prism mounts 183 and prisms 36 and 38 are attached may be rotated about axes 40 and 42 if necessary. The light rays then travel through the passageways 186 in the vertical portion 184 of the L-shaped extensions 170 and 171 and through lenses 44 and 46. The light rays then travel to prisms 48 and 50 which are secured to prism mounts 204. Prism mounts 204 are rotated by displacing or rotating the L-shaped extensions 170 and 171. This causes one of the vertical portions 184 to move relative to its lens housing 194 and the other vertical portion 184 to move relative away from its lens housing 194 in a piston-like manner similar to pistons in an engine. Hence, one of the optical paths of axes 52 and 54 is compressed while the other is stretched. The light then travels through prisms 60 and 62 which may be rotated about axes 56 and 58 when the base housing 230 is rotated relative to the lens housing 194 in either direction about axes 56 and 58. The base housing 230 is then locked in place by lock screw 228. The light rays then pass through corresponding apertures in the mask 240 to the secondary observer's eyes 64. The mask 240 can remain parallel to the image or floor. It should be appreciated that the base housing 230 may be rotated more than fifteen (15) degrees in either direction.

The present invention has been described in an illustrative manner. It is to be understood that the terminology which has been used is intended to be in the nature of words of description rather than of limitation.

Obviously, many modifications and variations of the present invention are possible in light of the above teachings. Therefore, within the scope of the appended claims, the present invention may be practiced otherwise than a specifically described.

We claim:

1. A microscope system for viewing an image from at least two viewing stations, one of the viewing stations being orthogonal to the other viewing station, said system comprising:

an objective lens common to at least two paths of light rays from the image to be viewed;

first prism means for re-directing at least one of the light rays from the objective lens in a direction orthogonal to the other of the light rays which travels to a first viewing station;

second prism means being rotatable about its optical axis for redirecting the orthogonal light ray to a second viewing station such that the second viewing station is maintained parallel to the image; and means for compressing or stretching the path of said orthogonal light ray as said second prism means is rotated.

2. The microscope system as set forth in claim 1 wherein said second prism means comprises a plurality of angle prisms.

3. The microscope system as set forth in claim 2 wherein said first prism means comprises a right angle prism.

4. A microscope system for viewing an image from at least two viewing stations, one of the viewing stations being orthogonal to the other viewing station, said system comprising:
- an objective lens common to at least two paths of light rays from the image to be viewed;
- a first prism disposed on one side of said objective lens for re-directing at least one pair of the light rays passing through said objective lens in a direction ninety degrees to the other light rays which travels to a first viewing station;
- at least one pair of lenses laterally spaced from said first prism for magnifying the pair of light rays from said first prism;
- a first pair of prisms laterally spaced from said pair of lenses and being rotatable to redirect the pair of light rays from said lenses in a direction ninety degrees relative thereto;
- a second pair of prisms vertically spaced from said first pair of prisms and being rotatable to redirect the pair of light rays from said first pair of prisms in a direction ninety degrees relative thereto; and
- a third pair of prisms laterally spaced from said second pair of prisms and being rotatable to redirect the light ray from said second pair of prisms in a direction ninety degrees relative thereto to a second viewing station.

5. The microscope system as set forth in claim 4 wherein said second pair of prisms comprises a plurality of right angle prisms.

6. The microscope system as set forth in claim 5 wherein said first prism comprises a right angle prism.

7. A microscope attachment for viewing an image from at least two viewing stations, one of the viewing stations being orthogonal to the other viewing station, comprising:
- a primary housing;
- an objective lens disposed within said primary housing and being common to at least two paths of light rays from the image to be viewed;
- a first prism disposed within said primary housing and disposed adjacent said objective lens;
- first means for allowing rotation of said first prism;
- an extension housing being secured to said primary housing and extending outwardly therefrom;
- said first prism redirecting at least one pair of the light rays passing through said objective lens into said extension housing;
- at least one pair of lenses disposed within said extension housing for magnifying the pair of light rays;
- a pair of extensions attached to said extension housing and being rotatable thereabout;
- a second prism disposed within each of said pair of extensions for redirecting the light ray in a direction ninety degrees relative thereto;
- second means for allowing rotation between said pair of extensions and said extension housing;
- a pair of lens housings attached to said pair of extensions;
- third means for allowing axial movement between each of said lens housing and each of said extensions;
- a third prism disposed within each of said lens housings for redirecting the light ray in a direction ninety degrees relative thereto;
- a base housing attached to said lens housings and being rotatable;
- fourth means for allowing rotation between said lens housing and said base housing; and
- a fourth prism disposed within said base housing for redirecting the light ray in a direction ninety degrees relative thereto to a second viewing station.

8. The invention as set forth in claim 7 including means for locking the relative position between said base housing and said lens housing.

9. The invention as set forth in claim 8 including mounting means for supporting said second prism and said third prism and said fourth prism.

10. The invention as set forth in claim 9 including means for securing said second, third and fourth prisms to said mounting means.

11. The invention as set forth in claim 10 including first fastening means for securing said mounting means to either one of said extensions, said lens housings, and said base housing and prevent relative rotation therebetween.

12. The invention as set forth in claim 11 wherein said first rotation means comprises a base member for securing said first prism thereto, a plate member integral with said base member and disposed in an aperture formed in said primary housing, and a lever attached to said plate member.

13. The invention as set forth in claim 12 wherein said extension housing includes means forming a pair of spaced passageways therein.

14. The invention as set forth in claim 13 wherein said extension housing includes a pair of tubular extensions extending outwardly at each end.

15. The invention as set forth in claim 14 wherein said extension is L-shaped and has one end disposed about said extension at one end of said extension housing.

16. The invention as set forth in claim 15 wherein said primary housing includes means forming a pair of spaced passageways, said tubular extensions at one end of said extension housing being disposed within said passageways of said primary housing.

17. The invention as set forth in claim 16 including means for detachably securing said primary housing to said extension housing.

18. The invention as set forth in claim 17 wherein said third means comprises a slot formed in said extension and a fastener engaging said lens housing and being disposed in said slot to limit the axial movement between said extension and said lens housing.

19. The invention as set forth in claim 18 wherein said locking means comprises a stop member engageable with said lens housing and a fastener secured to said stop and being rotatable to move said stop to functionally engage and disengage said lens housing.

20. The invention as set forth in claim 19 wherein said rotation means includes a pair of spaced pins disposed in a groove formed about one end of said lens housing.

* * * * *